(12) United States Patent
Mudulodu et al.

(10) Patent No.: US 7,916,800 B2
(45) Date of Patent: *Mar. 29, 2011

(54) METHOD FOR ESTIMATING FREQUENCY OFFSET AT A SUBSCRIBER STATION RECEIVER IN A MULTI-CARRIER SYSTEM

(75) Inventors: Sriram Mudulodu, Santa Clara, CA (US); Louay Jalloul, Santa Clara, CA (US); Bertrand Hochwald, Santa Clara, CA (US)

(73) Assignee: Broadcom Corporation, Irvine, CA (US)

(*) Notice: Subject to any disclaimer, the term of this patent is extended or adjusted under 35 U.S.C. 154(b) by 672 days.

This patent is subject to a terminal disclaimer.

(21) Appl. No.: 11/998,541

(22) Filed: Nov. 30, 2007

(65) Prior Publication Data

US 2009/0141832 A1 Jun. 4, 2009

(51) Int. Cl.
*H04L 27/28* (2006.01)
(52) U.S. Cl. .......................... 375/260; 375/220
(58) Field of Classification Search .......... 375/260, 375/220, 219, 222; 370/319, 347
See application file for complete search history.

(56) References Cited

U.S. PATENT DOCUMENTS

| 7,039,131 | B2 | 5/2006 | Banerjea |
| 7,218,691 | B1 | 5/2007 | Narasimhan |
| 7,224,666 | B2 | 5/2007 | Gummadi et al. |
| 2005/0169165 | A1 | 8/2005 | Cimini et al. |
| 2007/0142067 | A1* | 6/2007 | Cheng et al. ............... 455/512 |
| 2007/0230388 | A1* | 10/2007 | Li et al. ....................... 370/313 |
| 2008/0205451 | A1* | 8/2008 | Ramesh et al. ............. 370/491 |
| 2009/0074045 | A1* | 3/2009 | Mudulodu et al. .......... 375/226 |
| 2009/0092199 | A1* | 4/2009 | Mudulodu et al. .......... 375/267 |
| 2010/0040167 | A1* | 2/2010 | Aoki et al. .................. 375/267 |

* cited by examiner

*Primary Examiner* — Emmanuel Bayard
(74) *Attorney, Agent, or Firm* — McAndrews, Held & Malloy, Ltd.

(57) ABSTRACT

A method and system of estimating frequency offset of a subscriber station is disclosed. The method includes the subscriber station receiving a composite signal, wherein the composite signal includes multi-carrier signals transmitted from a plurality of base stations. The subscriber station selects a subset of the plurality of base stations. The subscriber station selects at least one pair of multi-carrier symbols of the composite signal, wherein each of the at least one pair of multi-carrier symbols includes a plurality of pilot sub-carriers. The subscriber station selects at least one group of the plurality of pilot sub-carriers within the at least one pair of multi-carrier symbols based on transmit pilot symbols of the pilot sub-carriers of the multi-carrier signals transmitted by the subset of the plurality of base stations. The frequency offset is estimated based on a conjugate product between a linear combination of received symbols of a first multi-carrier symbol of a pair of multi-carrier symbols with a linear combination of received symbols of a second multi-carrier symbol of the pair of multi-carrier symbols on each of the pilot sub-carriers of the at least one group of the plurality of pilot sub-carriers.

24 Claims, 5 Drawing Sheets

OFDM SYMBOL 1                         OFDM SYMBOL 5
                                      (N=4)

A1*[S1(1,1), S2(1,1)] +               A2*[S1(1,5), S2(1,5)] +

B1*[S1(3,1), S2(3,1)] +               B2*[S1(3,5), S2(3,5)] +

C1*[S1(5,1), S2(5,1)]                 C2*[S1(5,5), S2(5,5)]

Transmit Pilot Symbol                 Transmit Pilot Symbol
Vector of Symbol 1                    Vector of Symbol 5

METHOD FOR ESTIMATING FREQUENCY OFFSET AT A SUBSCRIBER STATION RECEIVER IN A MULTI-CARRIER SYSTEM

FIELD OF EMBODIMENTS

The described embodiments relate generally to wireless communication networks and more specifically to methods of estimating frequency offset at a subscriber station receiver.

BACKGROUND

Wireless networks are gaining popularity because wireless infrastructures are typically easier and less expensive to deploy than wired networks. However, wireless networks can be susceptible to environmental conditions, interference and other impairments. A popular wireless network implementation uses base stations that communicate with wireless user devices that are located within cells associated with the base stations.

Carrier frequencies at the transmitter and the receiver are generally derived from different sources. For example, in a mode of the 802.16e standard systems, the base stations (BS) derive their carrier frequency from a GPS (global positioning system) clock and the subscriber station (SS) typically derives its carrier frequency from a crystal oscillator. The carrier frequencies of the two devices can be as much as tens of KHz apart. The difference between the transmitter frequency and receiver frequency is referred to as the frequency offset.

A large frequency offset error degrades the performance of the receiver. The smaller the frequency offset, the better the performance of the receiver. Better performance translates to increased data rates, lower transmitter power, and therefore, increased battery life.

The performance of the frequency offset estimation and tracking must be adequate even in the presence of interference. Generally, there are two main additive impairments at the receiver in a wireless communication system. The impairments include both interference and noise. The interference can come from devices inside and outside of the system. The noise is typically includes Additive White Gaussian Noise (AWGN) or thermal noise. Most wireless systems are interference limited, meaning the effect of interference dominates that of additive noise at the receiver. Frequency offset estimation and tracking algorithms can be used to reduce the effects of interference and noise.

There is a need for method and system for estimating frequency offset between a wireless base station and a wireless terminal in the presence of interference.

SUMMARY

An embodiment includes a method of estimating frequency offset at a subscriber station. The method includes the subscriber station receiving a composite signal, wherein the composite signal includes multi-carrier signals transmitted from a plurality of base stations. The subscriber station selects a subset of the plurality of base stations. The subscriber station selects at least one pair of multi-carrier symbols of the composite signal, wherein each of the at least one pair of multi-carrier symbols includes a plurality of pilot sub-carriers. The subscriber station selects at least one group of the plurality of pilot sub-carriers within the at least one pair of multi-carrier symbols based on transmit pilot symbols of the pilot sub-carriers of the multi-carrier signals transmitted by the subset of the plurality of base stations. The frequency offset is estimated based on a conjugate product between a linear combination of received symbols of a first multi-carrier symbol of a pair of multi-carrier symbols with a linear combination of received symbols of a second multi-carrier symbol of the pair of multi-carrier symbols on each of the pilot sub-carriers of the at least one group of the plurality of pilot sub-carriers.

Other aspects and advantages of the described embodiments will become apparent from the following detailed description, taken in conjunction with the accompanying drawings, illustrating by way of example the principles of the described embodiments.

BRIEF DESCRIPTION OF DRAWINGS

A more complete appreciation of the described embodiments is provided by reference to the following detailed description when considered in conjunction with the accompanying drawings.

DETAILED DESCRIPTION

Before describing embodiments, it is to be observed that the embodiments provide examples of methods of estimating frequency offset between a subscriber station and at least one base station of a wireless system. The frequency offset estimation can be used to improve wireless communication of the system. In some embodiments, the frequency offset can be made based on signals received from multiple base stations in which the carrier frequencies of the multiple base stations are not precisely synchronized, or the received signals suffer from Doppler delay spread.

Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

It is to be understood that the term symbol can be used having different meanings. The terms multi-carrier symbol and orthogonal frequency division multiplexing (OFDM) symbol are used interchangeably. It is to be understood that an OFDM symbol is a type of multi-carrier symbol. The word symbol can also be used having the meaning of a modulation symbol which is transmitted on a sub-carrier. The term symbol can also be used to denote the received signal on a sub-carrier, in which case it can be referred to as a received symbol.

Figure 1:
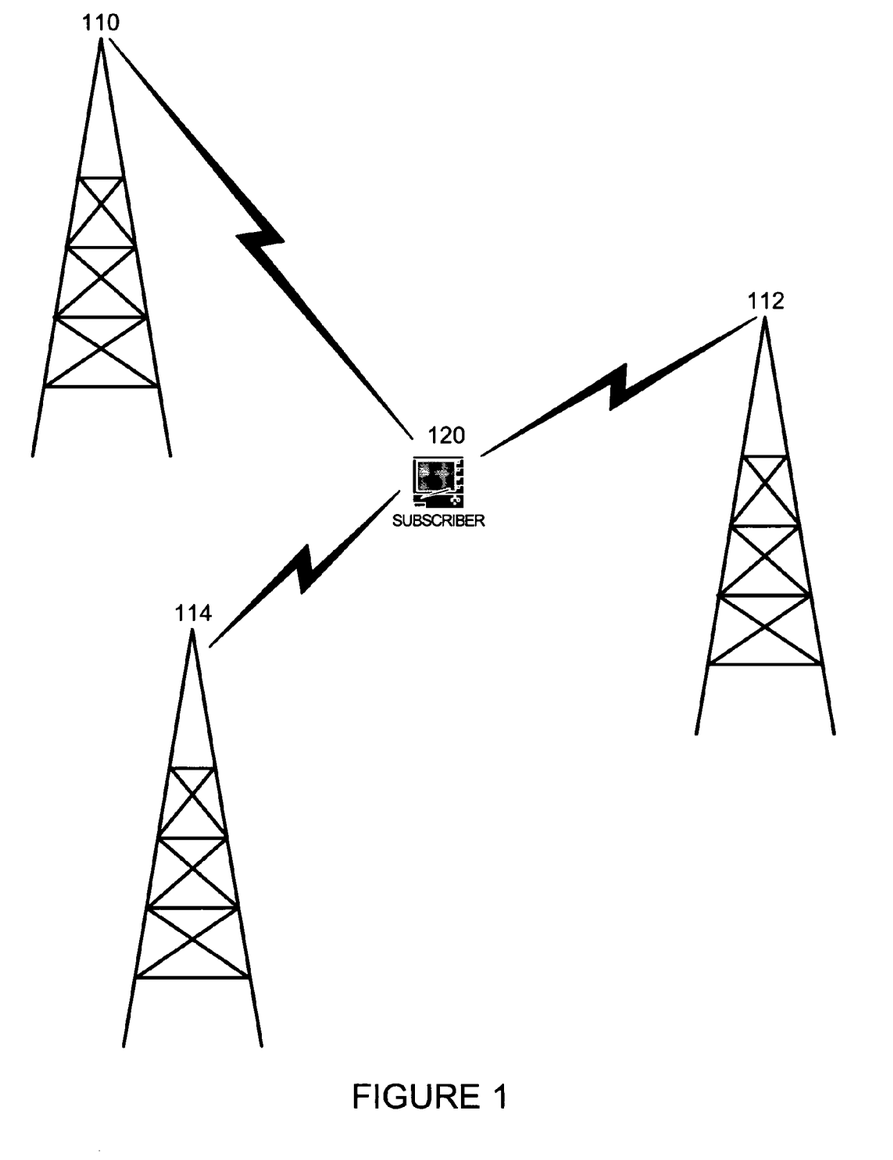
FIG. 1 illustrates an example of a wireless communication system that includes multiple base stations.

FIG. 1 illustrates an example of a wireless communication system that includes multiple base stations 110, 112, 114. A wireless subscriber station 120 receives wireless transmission signals from one or more of the base stations 110, 112,

114. The wireless communication system can include various subscriber stations, such as, mobile phones, personal computers, laptops or personal digital assistants (PDAs), and a plurality of base stations. One or more subscriber stations can be located in a service area corresponding to one or more base stations.

One embodiment of the wireless transmission signals of the base stations 110, 112, 114 include pilot sub-carriers that can be used to estimate the frequency offset between at least one of the base stations 110, 112, 114 and the wireless subscriber station 120. As will be described, pilot sub-carriers transmitted from more than one base station 110, 112, 114 can be received by the subscriber station 120. Pilot symbols are transmitted on the pilot sub-carriers. The pilot symbols transmitted by one base station can be completely different from the pilot symbols transmitted by a different base station. The received symbols on selected pilot sub-carriers can be processed to provide an estimate of the frequency offset between the subscriber station 120 and the base stations 110, 112, 114. As will be described, the processing includes obtaining a linear combination of received symbols on selected pilot sub-carriers on two different OFDM symbols and performing a complex conjugate product between the two.

Figure 2:
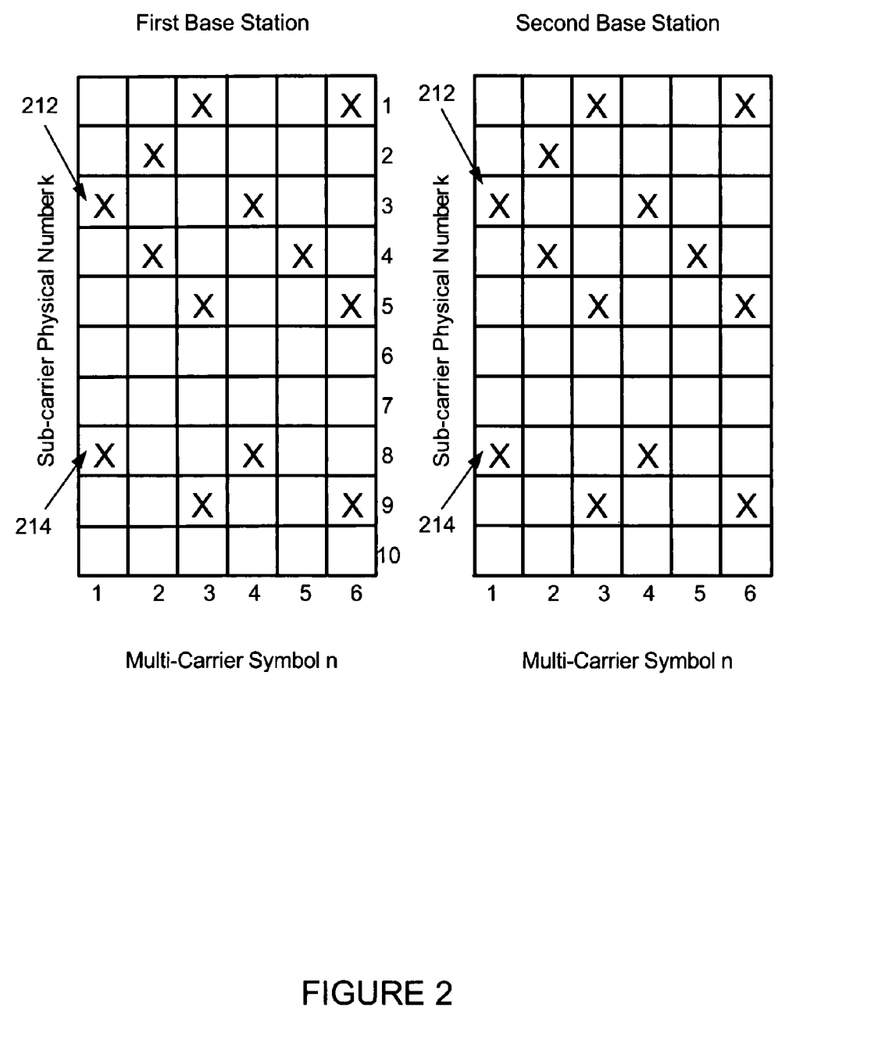
FIG. 2 illustrates an example of a downlink sub-frame of transmission between a base station and a subscriber station.

FIG. 2 illustrates an example of a portion of a downlink sub-frame of transmission between a base station and a subscriber station. The downlink sub-frame includes pilot sub-carriers located at some of the sub-carriers of the multi-carrier symbols. Within the downlink sub-frame, a sub-carrier index can be designated by k and the multi-carrier symbols can be designated by n. FIG. 2 shows 10 sub-carriers (that is, k varies from 1 to 10) and 6 multi-carrier symbols (that is, n varies from 1 to 6). However, it is to be understood that the described embodiments are not limited to any particular ranges of values of k and n.

As mentioned, characteristics of the pilot symbols of the pilot sub-carriers can be observed. Based on the observations, the received symbols of select pilot sub-carriers of pairs of multi-carrier symbols can be used to estimate the frequency offset. The frequency offset can be estimated based on complex conjugates products between linear combinations of received symbols of selected pairs of multi-carrier symbols.

An embodiment includes identifying at least one group of pilot sub-carriers of the pair of multi-carrier symbols by identifying a linear combination of transmit pilot symbol vectors across the group of pilot sub-carriers of a first of the pair of multi-carrier symbols that is substantially equal to a linear combination of transmit pilot symbol vectors across the group of pilot sub-carriers of a second of the pair of multi-carrier symbols. The weights used in the linear combinations of the transmit pilot symbol vectors of the group of sub-carriers can be different for the two OFDM symbols, and can be complex numbers.

The frequency offset can be estimated based on a complex conjugate product between the linear combination of received symbols of identified group of pilot sub-carriers of the first symbol and the linear combination of received pilot symbols of the identified group of pilot sub-carriers of the second symbol. That is, the phase of the conjugate product can be used to estimate the frequency offset.

As mentioned, the downlink sub-frame includes pilot sub-carriers located at known and fixed sub-carrier locations. For example, the first multi-carrier symbol (n=1) of the first and second base stations includes pilot carriers 212, 214 at sub-carriers k=3 and k=8. These pilot sub-carriers may be selected for estimating the frequency offset if the pilot symbols of the selected subset of base stations that are transmitted on these pilot sub-carriers satisfy the above-described criteria.

Figure 3:
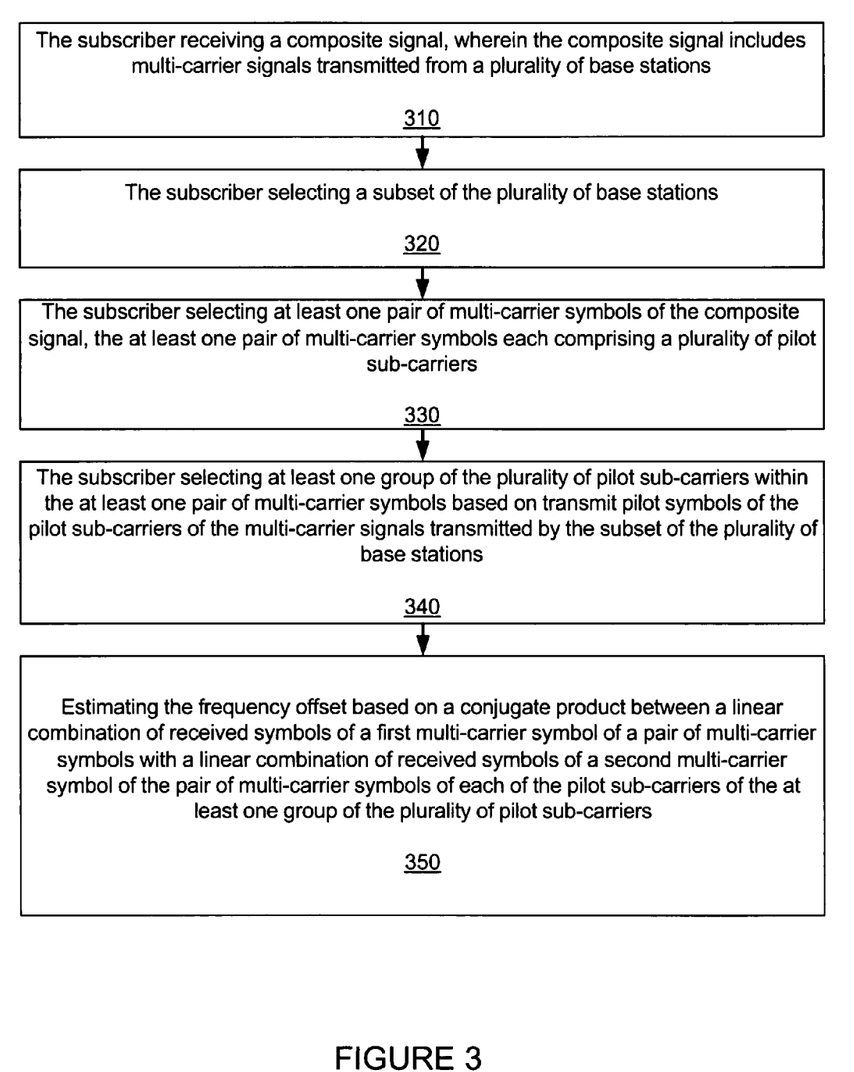
FIG. 3 is a flow chart that includes one example of steps of a method of estimating frequency offset of a subscriber station.

FIG. 3 is a flow chart that includes one example of steps of a method of estimating frequency offset of a subscriber station. A first step 310 includes the subscriber station receiving a composite signal, wherein the composite signal includes multi-carrier signals transmitted from a plurality of base stations. A second step 320 includes the subscriber station selecting a subset of the plurality of base stations. A third step 330 includes the subscriber station selecting at least one pair of multi-carrier symbols of the composite signal, the at least one pair of multi-carrier symbols each comprising a plurality of pilot sub-carriers. A fourth step 340 includes the subscriber station selecting at least one group of the plurality of pilot sub-carriers within the at least one pair of multi-carrier symbols based on transmit pilot symbols of the pilot sub-carriers of the multi-carrier signals transmitted by the subset of the plurality of base stations. A fifth step 350 includes estimating the frequency offset based on a conjugate product between a linear combination of received pilot symbols of a first multi-carrier symbol of a pair of multi-carrier symbols with a linear combination of received pilot symbols of a second multi-carrier symbol of the pair of multi-carrier symbols of each of the pilot sub-carriers of the at least one group of the plurality of pilot sub-carriers. The frequency offset estimate can be used as an error signal in a frequency tracking loop.

An embodiment includes the subscriber station selecting at least one group of the plurality of pilot sub-carriers within the multi-carrier symbols by identifying at least one group of pilot sub-carriers of the pair of multi-carrier symbols by identifying a linear combination of transmit pilot symbol vectors across the group of pilot sub-carriers of a first of the pair of multi-carrier symbols that is substantially equal to a linear combination of transmit pilot symbol vectors across the group of pilot sub-carriers of a second of the pair of multi-carrier symbols. More specifically, each element of the two linear combinations are substantially equal.

An embodiment includes the weights used to obtain the linear combination of transmit pilot symbol vectors across the group of pilot sub-carriers of the first of the pair of multi-carrier symbols are substantially equal to weights used to obtain linear combination of received pilot symbols of the at least one group of the plurality of sub-carriers of a first multi-carrier symbol of the pair of multi-carrier symbols. Additionally, the weights used to obtain the linear combination of transmit pilot symbol vectors across the group of pilot sub-carriers of a second of the pair of multi-carrier symbols are substantially equal to weights used to obtain the linear combination of received pilot symbols of the at least one group of the plurality of sub-carriers of a second multi-carrier symbol of the pair of multi-carrier symbol.

For one embodiment, the group of the plurality of pilot sub-carriers is selected depending on a coherence bandwidth. For another embodiment, a range of sub-carrier indices included within the at least one group is dependent upon a flatness of a pass-band of a transmission channel.

The complex conjugate products calculated from multiple groups of pairs of multi-carrier symbols can be summed.

Multiple pairs of multi-carrier symbols can be selected from the composite signal. The multiple pairs can be from the same frame, or from different frames.

For an embodiment, only a subset of available base stations is selected. For example, the subscriber station can determine received signal strength of each of the multi-carrier signals transmitted by each of the available base stations, and select a subset of the available base stations that have received signal strength greater than a threshold level. The subscriber station can reduce the subset of the plurality of base stations to N base stations having N greatest received signal strength. One embodiment includes the subscriber station reducing the subset of the plurality of base stations to two base stations having two greatest received signal strengths. Various other embodiments include the subscriber station selecting different subsets of base stations for each of different groups of sub-carriers, wherein the selections are based on a received signal strength for each of the groups of pilot sub-carriers, rather than only selecting one subset of base stations for all groups of pilot sub-carriers in the multi-carrier symbol pair.

Different methods can be used by the subscriber station to select the pairs of multi-carrier symbols. An embodiment includes the subscriber station selecting multi-carrier symbols where the pilot sub-carriers indices are the same. Another embodiment includes the subscriber station selecting multi-carrier symbols that are not adjacent. Another embodiment includes the subscriber station selecting multi-carrier symbols with a separation in time that is inversely proportional to the Doppler spread. Doppler spread gives an indication of the rate of change of the channel with time.

As shown and described below, weights are used in the linear combinations of transmit pilot symbol vectors across the group of pilot sub-carriers. The weights may be complex numbers.

An embodiment includes designating a desired base station, wherein the desired base station is the base station the subscriber station primarily received data from. For the desired base station, the linear combination of transmit pilot symbols across the group of pilot sub-carriers of a first of the pair of multi-carrier symbols is substantially equal to a linear combination of transmit pilot symbols across the group of pilot sub-carriers of a second of the pair of multi-carrier symbols, and is non-zero. However, for one or more non-desired base stations, the linear combination of transmit pilot symbols across the group of pilot sub-carriers of a first of the pair of multi-carrier symbols is substantially equal to a linear combination of transmit pilot symbols across the group of pilot sub-carriers of a second of the pair of multi-carrier symbols, and is substantially equal to zero.

Figure 4:
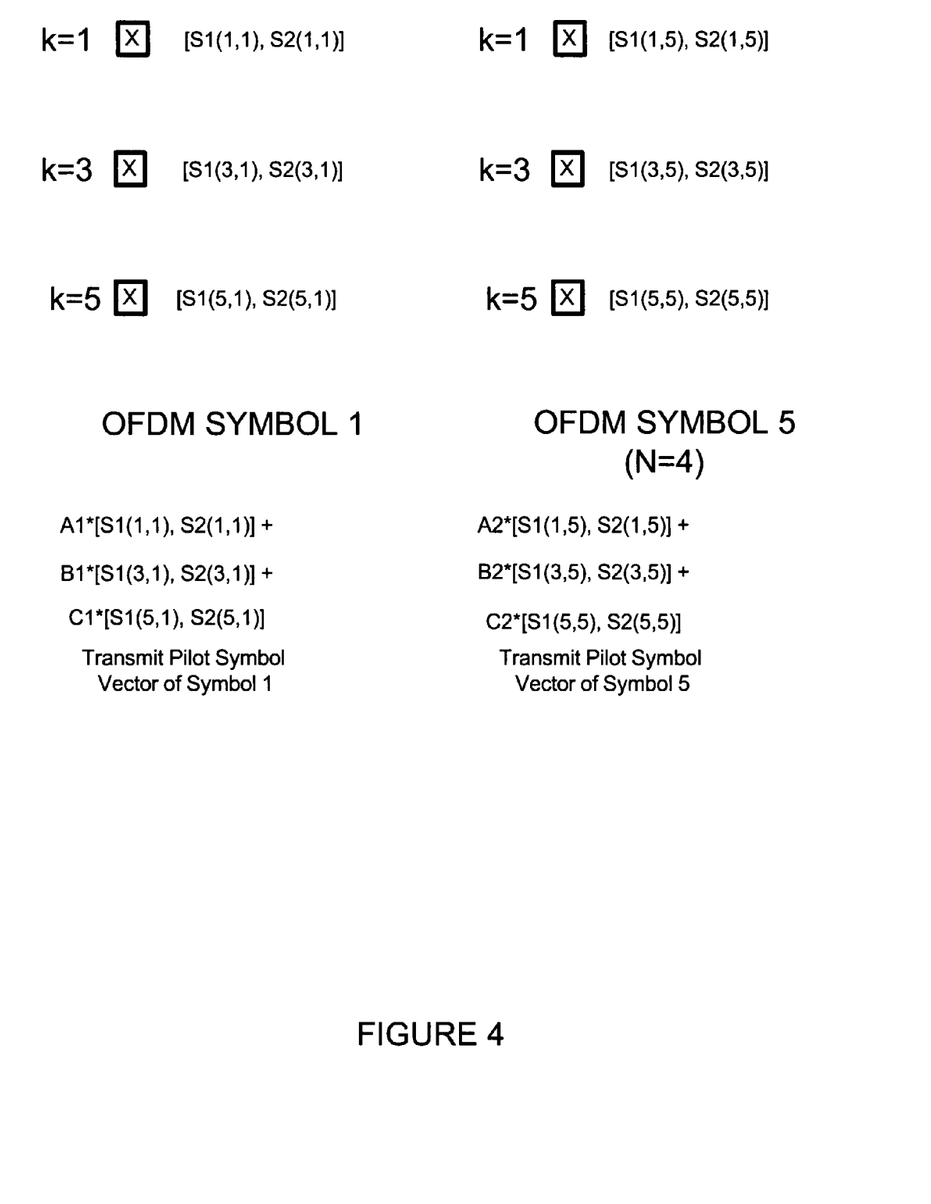
FIG. 4 illustrates an example of pilot sub-carriers of a downlink sub-frame of transmission between a base station and a subscriber station for a wireless system that the method of FIG. 3 is operable.

FIG. 4 illustrates an example of pilot sub-carriers of a downlink sub-frame of transmission between a base station and a subscriber station for a wireless system that the method of FIG. 3 may operate.

The exemplary pilot sub-carriers shown in FIG. 4 are located at sub-carriers k=1, 3, 5 and at symbols n=1, 5. That is, the group includes 3 sub-carriers, and the multi-carrier symbols are spaced by N=4 symbols. These pilot sub-carriers are selected as a group if, for example, the linear combination of transmit pilot symbols of the pilot sub-carriers of the first symbol (n=1) is substantially equal to the linear combination of the transmit pilot symbols of the pilot sub-carriers of the second symbol (n=5) for both of the selected base stations S1, S2. That is, for example, A1*S1(1,1)+B1*S1(3,1)+C1*S1(5,1) is substantially equal to A2*S1(1,5)+B2*S1(3,5)+C2*S1(5,5), and A1*S2(1,1)+B1*S2(3,1)+C1*S2(5,1) is substantially equal to A2*S2(1,5)+B2*S2(3,5)+C2*S2(5,5). As previously described, the pilot sub-carriers included within the group can be limited to at least some extent based on the flatness of the transmission channel across the sub-carriers. The flatter the channel response, the more pilot sub-carriers can be included within the group. FIG. 4 shows transmit pilot symbol vectors below the corresponding symbols 1 and 4.

Once the group of pilot sub-carrier has been selected, the offset frequency can be estimated based on received symbols on the selected group of pilot sub-carriers. More specifically, a complex conjugate can be determined between a linear combination of the group of received symbols of first multi-carrier symbol and a linear combination of the group of received symbols of the second multi-carrier symbol. That is, for example, the linear combination of the received symbols on the pilot sub-carriers of the group of the first symbol (n=1) can be obtained as A1*Y(1,1)+B1*Y(3,1)+C1*Y(5,1) and the linear combination of the received symbols on pilot sub-carriers of the group of the second symbol (n=5) can be determined as A2*Y(1,5)+B2*Y(3,5)+C2*Y(5,5). The frequency offset can be estimated by computing the phase of the complex conjugate product of the linear combinations of the received symbols on the pilot sub-carriers of the group of the two multi-carrier symbols.

As previously described, the complex conjugate products can be summed over multiple multi-carrier symbol pairs. For example, the complex conjugate products can be summed over multiple multi-carrier symbol pairs within a frame or across multiple frames.

Figure 5A:
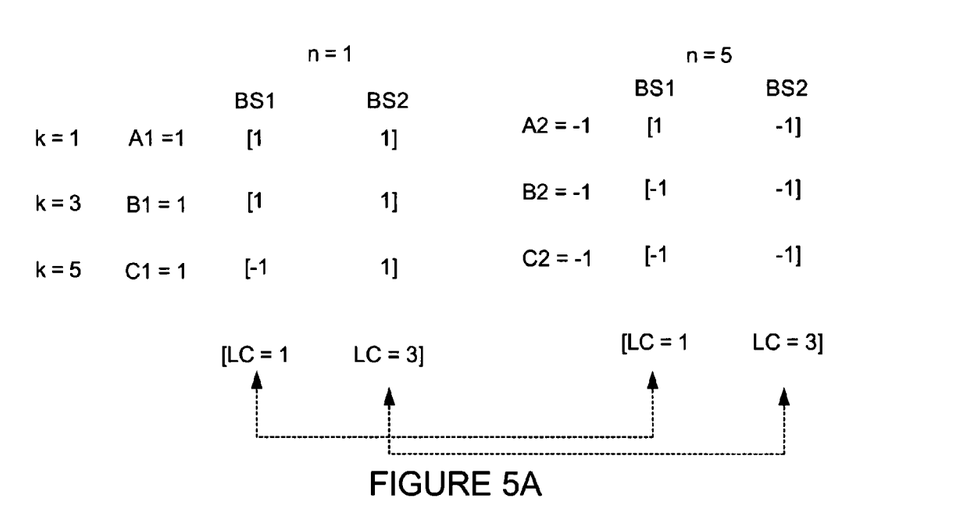
FIGS. 5A and 5B show examples of selected groups of multi-carrier pilot sub-carriers, and corresponding linear combinations.
Figure 5B:
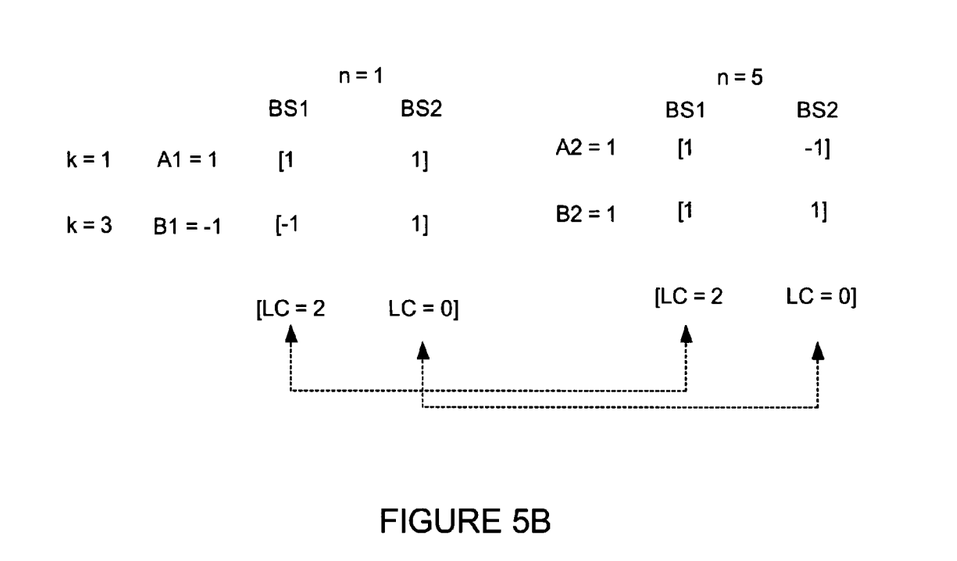

If the modulation format of the pilot symbols is BPSK, the processing is generally simpler than with other modulation formats. FIGS. 5A and 5B shows examples of linear combinations of transmit pilot symbol vectors across the group of pilot sub-carriers of a first of the pair of multi-carrier symbols that are substantially equal to linear combinations of transmit pilot symbol vectors across the group of pilot sub-carriers of a second of the pair of multi-carrier symbols. In this example the selected subset of base stations includes only two base stations (BS1 and BS2). However it is to be understood that any number of base stations can be included in the selected subset of base stations.

The example of FIG. 5A includes the linear combination of transmit pilot symbols of the first base station (BS1) being equal to a value of 1 (note that this is for the BPSK modulation format) and the linear combination of transmit pilot symbols of the second base station (BS2) being equal to a value of 3. This embodiment in which all of the linear combinations are non-zero is typically more robust in situations in which the carrier frequencies of the multiple base stations are synchronized as precisely (for example, the base stations are not synchronized to a GPS), or the subscriber station is moving, and therefore, the received signals suffer from Doppler spread.

As shown in FIG. 5A, if, for example, the selected pilot tone are k=1, k=3, k=5, for multi-carrier symbols 1 and 5, then selecting the weights for the linear combination of transmit pilot symbol vectors for the first symbol to be A1=1, B1=1, C1=1 results in a vector equal to [1, 3]. Furthermore, selecting the weighting for the linear combination of transmit pilot symbol vectors for the second symbol (N=5) to be A2=−1, B2=−1, C2=−1 results in a linear combination equal to [1, 3].

The example of FIG. 5B includes the linear combination of transmit pilot symbols of the first base station (BS1) being equal to a value of 2 (note that this is for the BPSK modulation format) and the linear combination of transmit pilot symbols of the second base station (BS2) being equal to a value of 0. This embodiment in which one or more of the linear combinations is substantially equal to zero is typically utilized when the base stations are not synchronized precisely (for example, the carriers of the base stations are controlled by a GPS) and the received signal is not suffering from Doppler delay spread. Note also that the example of FIG. 5A only includes two rather than three selected pilot sub-carriers. For one embodiment, the weights are selected so that a desired base station has linear combinations of its transmit pilot symbols being equal to a value that is non-zero, and all of the non-desired base stations(s) have linear combinations of their transmit pilot symbols being equal to a value that is zero. This allows the receiver to effectively cancel the non-desired base station(s) that are included in the subset of base stations.

As shown in FIG. 5B, if, for example, the selected pilot tone are k=1, k=3, for multi-carrier symbols 1 and 5, then selecting the weights for the linear combination of transmit pilot symbol vectors for the first symbol to be A1=1, B1=−1 results in a linear combination for the first symbol equal to, for example, [2, 0]. Furthermore, selecting the weights for the linear combination of transmit pilot symbol vectors for the second symbol (N=5) to be A2=1, B2=1 results in a linear combination equal to, for example, [2, 0].

Although specific embodiments have been described and illustrated, the embodiments are not to be limited to the specific forms or arrangements of parts so described and illustrated.

What is claimed:

1. A method of estimating frequency offset at a subscriber station, comprising:
   the subscriber station receiving a composite signal, the composite signal comprising multi-carrier signals transmitted from a plurality of base stations;
   the subscriber station selecting a subset of the plurality of base stations;
   the subscriber station selecting at least one pair of multi-carrier symbols of the composite signal, the at least one pair of multi-carrier symbols comprising a first multi-carrier signal including a plurality of first multi-carrier pilot sub-carriers, and a second multi-carrier signal including a plurality of second multi-carrier pilot sub-carriers;
   the subscriber station selecting at least one group of the plurality of first multi-carrier pilot sub-carriers within the at least one pair of multi-carrier symbols based on transmit pilot symbols of the pilot sub-carriers of the multi-carrier signals transmitted by the subset of the plurality of base stations;
   estimating the frequency offset based on a complex conjugate product between a linear combination of received pilot symbols of the at least one group of the plurality of sub-carriers of a first multi-carrier symbol of the pair of multi-carrier symbols and a linear combination of received pilot symbols of the at least one group of the plurality of sub-carriers of a second multi-carrier symbol of the pair of multi-carrier symbols.

2. The method of claim 1, wherein the subscriber station selecting at least one group of the plurality of pilot sub-carriers within the at least one pair of multi-carrier symbols based on transmit pilot symbols of the pilot sub-carriers of the multi-carrier signals comprises:
   Identifying at least one group of pilot sub-carriers of the pair of multi-carrier symbols by identifying a linear combination of transmit pilot symbol vectors across the group of pilot sub-carriers of a first of the pair of multi-carrier symbols that is substantially equal to a linear combination of transmit pilot symbol vectors across the group of pilot sub-carriers of a second of the pair of multi-carrier symbols.

3. The method of claim 2, wherein weights used to obtain the linear combination of transmit pilot symbol vectors across the group of pilot sub-carriers of the first of the pair of multi-carrier symbols are substantially equal to weights used to obtain linear combination of received pilot symbols of the at least one group of the plurality of sub-carriers of a first multi-carrier symbol of the pair of multi-carrier symbols, and weights used to obtain the linear combination of transmit pilot symbol vectors across the group of pilot sub-carriers of a second of the pair of multi-carrier symbols are substantially equal to weights used to obtain the linear combination of received pilot symbols of the at least one group of the plurality of sub-carriers of a second multi-carrier symbol of the pair of multi-carrier symbol.

4. The method of claim 1, wherein selecting at least one group of the plurality of pilot sub-carriers is dependent on a coherence bandwidth.

5. The method of claim 1, wherein a range of sub-carrier indices included within the at least one group is dependent upon a flatness of a pass-band of a transmission channel.

6. The method of claim 1, further comprising:
   summing conjugate products obtained from multiple groups of the pairs of multi-carrier symbols.

7. The method of claim 1, further comprising selecting multiple pairs of multi-carrier symbols of the composite signal.

8. The method of claim 6, wherein the multiple pairs are within a common frame.

9. The method of claim 6, wherein the multiple pairs are from different frames.

10. The method of claim 1, wherein the subscriber station selecting a subset of the plurality of base stations comprises:
    the subscriber station determining a received signal strength of each of the multi-carrier signals transmitted by each of the plurality of base stations;
    the subscriber station selecting a subset of the plurality of base stations that have a received signal strength greater than a threshold level.

11. The method of claim 9, further comprising the subscriber station reducing the subset of the plurality of base stations to N base stations having N greatest received signal strength.

12. The method of claim 9, further comprising the subscriber station reducing the subset of the plurality of base stations to two base stations having two greatest received signal strengths.

13. The method of claim 1, wherein the subscriber station selecting a subset of the plurality of base stations comprises:
    selecting different subsets of base stations for each of different groups of sub-carriers, wherein the selections are based on a received signal strength for each of the groups of sub-carriers.

14. The method of claim 1, wherein the pilot symbols of the multi-carrier signals transmitted by the plurality of base stations are BPSK modulated.

15. The method of claim 1, wherein the subscriber station selecting at least one pair of multi-carrier symbols of the composite signal, comprises the subscriber station selecting multi-carrier symbols where the pilot sub-carriers are the same.

16. The method of claim 1, wherein the subscriber station selecting at least one pair of multi-carrier symbols of the composite signal, comprises the subscriber station selecting multi-carrier symbols that are not adjacent.

17. The method of claim 1, wherein the subscriber station selecting at least one pair of multi-carrier symbols of the composite signal, comprises the subscriber station selecting multi-carrier symbols with a separation in time that is inversely proportional to the Doppler spread.

18. The method of claim 1, further comprising selecting multiple pairs of multi-carrier symbols of the composite signal.

19. The method of claim 17, wherein the multiple pairs are within a common frame.

20. The method of claim 17, wherein the multiple pairs are from different frames.

21. The method of claim 1, further comprising using the frequency offset estimate as an error signal in a frequency tracking loop.

22. The method of claim 1, wherein weights selected to determine the linear combinations of transmit pilot symbol vectors across the group of pilot sub-carriers comprise complex numbers.

23. The method of claim 2, wherein for a desired base station, the linear combination of transmit pilot symbols across the group of pilot sub-carriers of a first of the pair of multi-carrier symbols is substantially equal to a linear combination of transmit pilot symbols across the group of pilot sub-carriers of a second of the pair of multi-carrier symbols, and is non-zero, and for at least one non-desired base station the linear combination of transmit pilot symbols across the group of pilot sub-carriers of a first of the pair of multi-carrier symbols is substantially equal to a linear combination of transmit pilot symbols across the group of pilot sub-carriers of a second of the pair of multi-carrier symbols, and is substantially equal to zero.

24. A subscriber station that estimates frequency offset, comprising:

means for receiving a composite signal, the composite signal comprising multi-carrier signals transmitted from a plurality of base stations;

means for selecting a subset of the plurality of base stations;

means for selecting at least one pair of multi-carrier symbols of the composite signal, the at least one pair of multi-carrier symbols comprising a first multi-carrier signal including a plurality of first multi-carrier pilot sub-carriers, and a second multi-carrier signal including a plurality of second multi-carrier pilot sub-carriers;

means for selecting at least one group of the plurality of first multi-carrier pilot sub-carriers within the at least one pair of multi-carrier symbols based on transmit pilot symbols of the pilot sub-carriers of the multi-carrier signals transmitted by the subset of the plurality of base stations;

means for estimating the frequency offset based on a complex conjugate product between a linear combination of received pilot symbols of the at least one group of the plurality of sub-carriers of a first multi-carrier symbol of the pair of multi-carrier symbols and a linear combination of received pilot symbols of the at least one group of the plurality of sub-carriers of a second multi-carrier symbol of the pair of multi-carrier symbols.

\* \* \* \* \*